US008970512B2

(12) United States Patent
van Lieshout et al.

(10) Patent No.: US 8,970,512 B2
(45) Date of Patent: Mar. 3, 2015

(54) TOUCH SCREEN DISPLAY AND METHOD OF DRIVING THE TOUCH SCREEN DISPLAY WITH SIGNAL ADJUSTMENT

(75) Inventors: Petrus Johannes Gerardus van Lieshout, Eindhoven (NL); Bart Peeters, Eindhoven (NL)

(73) Assignee: Creator Technology B.V., Breda (NL)

( * ) Notice: Subject to any disclaimer, the term of this patent is extended or adjusted under 35 U.S.C. 154(b) by 840 days.

(21) Appl. No.: 12/976,590

(22) Filed: Dec. 22, 2010

(65) Prior Publication Data

US 2012/0162088 A1 Jun. 28, 2012

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 3/0418* (2013.01)
USPC ......................................................... 345/173

(58) Field of Classification Search
USPC ............. 345/173, 104, 174; 178/18.01–18.03
See application file for complete search history.

(56) References Cited

U.S. PATENT DOCUMENTS

| 2007/0216657 | A1* | 9/2007 | Konicek ......................... 345/173 |
| 2008/0278451 | A1 | 11/2008 | Lee |
| 2010/0164906 | A1* | 7/2010 | Fukunaga et al. ............ 345/175 |
| 2010/0253638 | A1 | 10/2010 | Yousefpor et al. |

FOREIGN PATENT DOCUMENTS

| WO | WO 2008/054209 A1 | 5/2008 |
| WO | WO 2008/054209 A2 | 5/2008 |
| WO | 2009075577 | * | 6/2009 | ................... 345/173 |
| WO | WO 2009/075577 A1 | 6/2009 |
| WO | WO 2010/043417 A2 | 4/2010 |

OTHER PUBLICATIONS

European Patent Office, International Search Report, International Application No. PCT/NL2011/050869, Apr. 27, 2012, Europe.

* cited by examiner

*Primary Examiner* — Pegeman Karimi

(57) ABSTRACT

A touch screen display device is described that includes a display panel, a display driver, a sensor circuit and a combination unit. The display panel has a plurality of display elements arranged between a first and a second electrode layer. The display driver is arranged for providing display signals comprising a common display signal and an input control signal to the display panel. The sensor circuit is arranged for providing a probe signal and a shield signal mutually having the same phase and frequency and for generating a touch signal in response to the output signal received from the first electrode layer. The combination unit provides a drive signal to the first electrode layer derived from the common display signal and the probe signal, and further provides an output control signal for the display panel from the input control signal and the shield signal.

20 Claims, 9 Drawing Sheets

TOUCH SCREEN DISPLAY AND METHOD OF DRIVING THE TOUCH SCREEN DISPLAY WITH SIGNAL ADJUSTMENT

BACKGROUND OF THE INVENTION

1. Field of the Invention

The present invention relates to a display device with a touch sensor. The present invention further relates to a method of operating a display device with a touch sensor.

2. Related Art

WO 2009075577 discloses a display device comprising a flexible display panel that includes a display structure responsive to output signals from the data processing facility, and a capacitive touch sensitive structure. In an embodiment the display structure and the touch sensitive structure share a transparent common electrode layer that is alternately coupled to a display driver and to a touch screen driver via a switching element.

During a first phase of operation the transparent common electrode layer, such as an ITO layer, is coupled to the display driver, so that the display driver can update the content of the display panel.

During a second phase of operation the common electrode layer is coupled to the touch screen driver. In the second phase of operation the transparent common electrode layer is driven with an AC voltage signal. Typically the transparent electrode layer is driven at each of four corners by a respective driver, each providing an AC-voltage signal (e.g. sinusoidal or block-shaped signal waveform), with the same amplitude, frequency and phase. By measuring the balance between the AC currents of all four corners, the coordinates of a touching finger can be determined. The finger causes a capacitive load of the transparent common electrode layer, thereby changing the AC currents of the four corners. The coordinates of the location where the panel is touched can then be calculated from the relative values of the AC-currents measured at the corners, for example, using a lookup table (LUT).

A shared common electrode layer is advantageous, in that it is not necessary to add extra layers to provide the touch screen functionality. In this way the display panel having the touch screen functionality can be relatively thin as compared to the case where the touch sensitive structure does not share the common electrode layer with the display structure. This is particularly advantageous for a flexible display, as a thinner display panel allows for a smaller radius of curvature. Also, there is no deterioration of optical display properties (e.g. brightness), as would have been caused by an extra layer.

However, it has been found that a touch sensitive structure that shares the common electrode layer with the display structure requires relatively high drive voltages as compared to embodiments wherein the common electrode layer is not shared in order to achieve a sufficient sensitivity. The requirement for relatively high driving voltages results in a relatively high power consumption. Moreover relatively powerful drivers are necessary to generate the driving voltages.

SUMMARY OF THE INVENTION

Accordingly it is desirable to achieve a sufficient sensitivity with lower drive voltages for the touch sensitive structure.

It is a first object of the invention to provide an improved display device. According to a first aspect of the invention a touch screen display device is provided comprising a display panel comprising a plurality of display elements arranged between a first electrode layer and a second electrode layer having respective pixel electrodes for the display elements, a display driver for providing display signals to the display panel, said display signals comprising a common display signal and an input control signal for controlling the display panel, a sensor circuit for providing a probe signal and a shield signal that has the same phase and frequency as the probe signal, and for generating a touch signal in response to an output signal received from the first electrode layer, a combination unit for providing a drive signal to the first electrode layer derived from the common display signal and the probe signal, and for providing an output control signal for controlling the display panel from the input control signal and the shield signal.

In the sequel the first electrode layer and the second electrode layer are also referred to as a common electrode layer and a further electrode layer respectively.

It is a second object of the invention to provide an improved method of driving a display.

According to a second aspect there is provided a method of driving a touch screen display device that comprises a display panel comprising a plurality of display elements arranged between a first electrode layer and a second electrode layer having respective pixel electrodes for the display elements. The method according to the second aspect comprises the steps of:

providing display signals for the display panel, comprising a common display signal and an input control signal for the display panel, providing a probe signal and a shield signal that has the same phase and frequency as the probe signal, and generating a touch signal in response to an output signal received from the first electrode layer, providing a drive signal to the first electrode layer derived from the common display signal and the probe signal, and providing an output control signal for the display panel from the input control signal and the shield signal.

In the display device according to the first aspect of the invention the touch screen module provides a shield signal that has a same phase and frequency as the second input common signal, and the combination unit provides at least one output control signal for the display panel from the shield signal and at least one input control signal.

By the measures of the present invention a touch screen functionality with a relatively high sensitivity is achieved even with a relatively low amplitude of the driving voltage used for sensing. Without wishing to be bound by theory it is believed that the effect of the application of the shield signal to other electrically conductive structures in the display is a reduction of parasitic currents between the common electrode layer and said other electrically conductive structures. With this reduction noise in measured currents is reduced, so that the accuracy of a position determination can be improved without increasing a drive voltage.

In an embodiment the display device is an active matrix display and the at least one output control signal is an output control signal for the active matrix layer.

In an embodiment of the display device according to the first aspect, the combination unit comprises: a first multiplexer for deriving the drive signal by multiplexing the common display signal and the at least one probe signal; and a second multiplexer for deriving the at least one output control signal by multiplexing the shield signal and the at least one of the input control signals.

In an embodiment the combination unit combines the signals in time, by multiplexing. Therein the display device is repetitively switched between a driving mode and a user interaction mode. This embodiment is particularly suitable for display panels of a bistable or multistable type, such as electrophoretic displays. Switching between display driving and touching may be controlled by an application or user interface. In a typical example driving will take 0.5-1 s, after which the system waits for user interaction (typically 1-30 s), to which the response of the system will be to update the display contents.

In another embodiment the combination unit combines the signals by superposition. This other embodiment is advantageous in that the display can be continuously provided with display signals, while the touch sensing circuitry can continuously receive sense signals. In a typical application of this embodiment a keyboard is displayed on the display. When typing on the displayed keyboard, the type string can be updated while the touch systems are still responsive for touch events.

In an embodiment of the display device having an active matrix layer, the pixel electrodes are coupled to a first side of a respective storage capacitor, a second side of said storage capacitor being coupled to the storage line and the at least one of the control signals is a signal for driving the storage line. The storage line may be one of a plurality of storage lines, wherein each of the storage lines is coupled to the combination unit, which provides a storage line control signal obtained by a combination of the shield signal and an input storage line control signal. This embodiment wherein the shield signal, having the same phase and frequency as the probe signal, is provided to the storage lines either intermittently, or superposed to the input storage line control signal is particularly effective for suppressing noise in the sense signals. Additionally, or alternatively, the shield signal is coupled via the combination unit to other conductive structures of the display device such as, for example, a ground network.

It is noted that use of a storage capacitor in an active matrix display is known from WO/2008/054209. Said patent application further discloses a controller that is configured to switch the common electrode at a substantially same time, and with a voltage swing corresponding to a voltage at the capacitor line. Therewith it is achieved that the voltage at the common electrode can be changed, without substantially changing the voltage between the pixel electrode and the common electrode. WO/2008/054209 does not, however, disclose nor suggest any touch screen functionality.

Typically touch screen drive signals for use in a capacitive type touch screen are in a frequency range that is substantially higher than the signals used for driving the display. The touch screen drive signals may, for example, have a frequency in the range of 10 kHz to 500 kHz, whereas the display drive signals are typically in a range of 0 to 100 Hz. Furthermore the touch screen drive signals have a voltage amplitude (e.g., in the order of 1 to 2 V) that is significantly lower than the amplitude used for the drive signals (e.g., in the order of 5 to 15 V). In particular the relatively high frequency of the touch screen signals prevents any visible effect thereof on the displayed data.

In an embodiment of the display device according to the first aspect, the display driver and the sensor circuit have small signal drivers for those signals that are combined by the combination unit and the combination unit has a respective amplifier for amplification of the combined signals. In this way less circuitry is required for generating and processing the large signals. For the purpose of the present application the input signals of the combination unit will be considered "small" signals if the said amplifiers provide for amplification by at least a factor of 10.

BRIEF DESCRIPTION OF THE DRAWINGS

These and other aspects are described in more detail with reference to the drawings, wherein.

DETAILED DESCRIPTION OF EMBODIMENTS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes and sizes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element or layer is referred to as being "coupled to" another element or layer, it can be directly on, connected or coupled to the other element or layer or intervening elements or layers may be present. In contrast, when an element is referred to as being "connected to" another element or layer, there are no intervening elements or layers present. Like numbers refer to like elements throughout. As used herein, the term "and/or" includes any and all combinations of one or more of the associated listed items.

Figure 1:
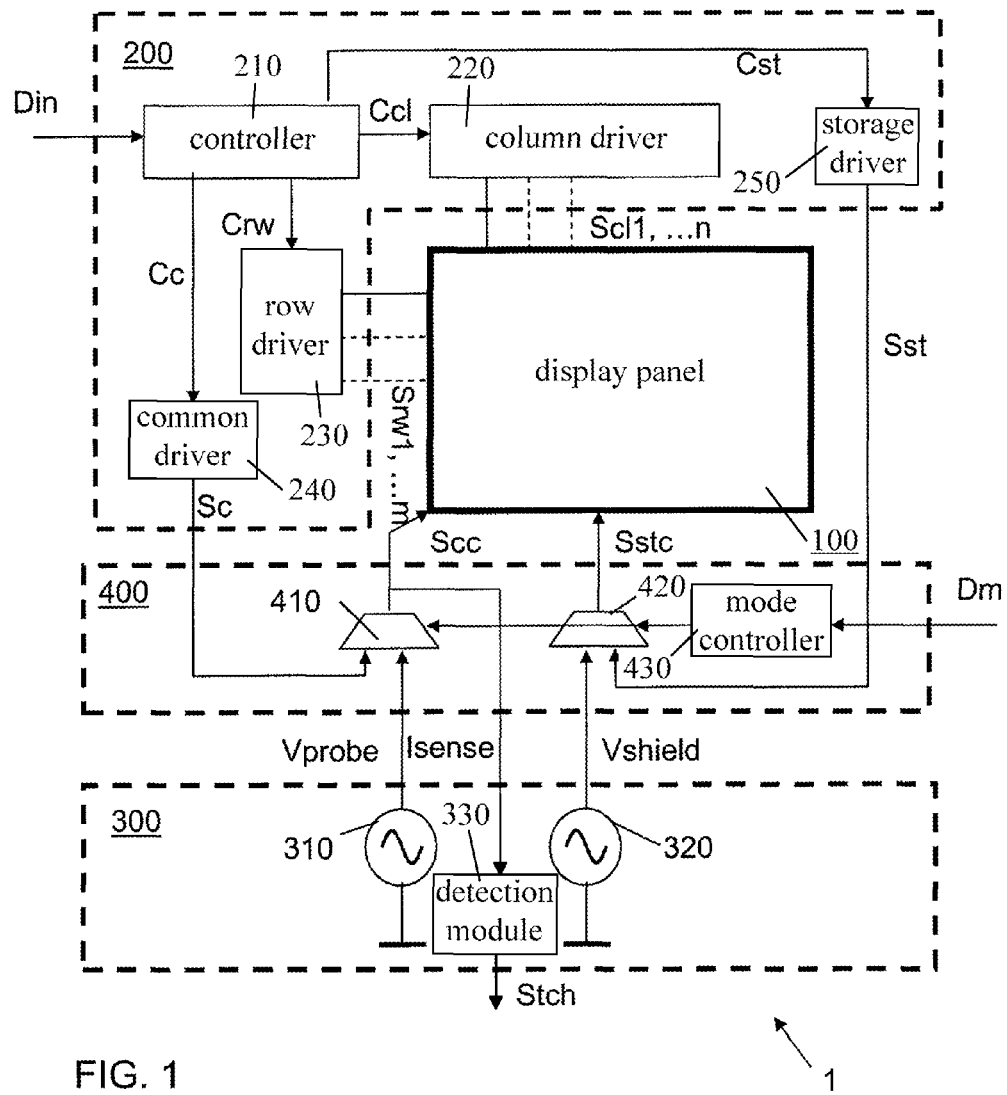
FIG. 1 schematically shows a first embodiment of a touch screen display according to the first aspect.

FIG. 1 schematically shows a touch screen display device 1. The display device comprises a display panel 100, shown in more detail in FIG. 2, comprising display elements arranged between a common electrode layer and a further electrode layer having respective pixel electrodes for the display elements. In the embodiment of FIG. 1 the display panel includes an active matrix layer for driving the pixel electrodes. Alternatively the display panel may include a passive matrix or a segmented/direct drive display.

The display device further comprises a display driver 200 for providing display signals to the display panel 100. The display signals comprise at least a common display signal Sc and input control signals for the active matrix layer, e.g. Srw1, ... and Scl1, ... respectively.

The display device further comprises a sensor circuit 300 for providing at least one probe signal Vprobe and a shield signal Vshield that has the same phase and frequency as the probe signal Vprobe. The sensor circuit 300 is also constructed for generating a touch signal Stch in response to an output signal Isense received from the common electrode layer.

The display device further comprises a combination unit 400 for providing a drive signal Scc to the common electrode layer derived from the common display signal Sc and the at least one probe signal Vprobe. The combination unit 400 further provides at least one output control signal Sstc for the active matrix layer from the shield signal Vshield and at least one of the input control signals Sst generated by the display driver 200.

In the embodiment of the display device according to FIG. 1 the display driver 200 comprises a controller 210. The display driver 200 further comprises a column driver 220, a row driver 230, a common driver 240 and a storage driver 250 that are controlled by the controller 210. In an operational mode the controller 210 receives data input signals Din from an application which may interact with a user interface. The application, for example, receives the data input signals from a data memory. In response to the data input signals the controller 210 provides respective control signals Ccl, Crw, Cc and Cst for the column driver 220, the row driver 230, the common driver 240 and the storage driver 250. The column driver 220 generates column signals Scl1, ..., n in response to control signal Ccl. The row driver 230 generates row signals Srw1, ..., m in response to control signal Crw. The common driver 240 generates a common signal Sc in response to control signal Cc and the storage driver 250 generates storage signal Sst in response to control signal Cst.

In the embodiment shown, the sensor circuit 300 is provided with a first and a second signal generator 310, 320. The first signal generator 310 provides the at least one probe signal Vprobe and the second signal generator 320 provides the shield signal Vshield. Although the best results are potentially obtained if the amplitude of the shield signal Vshield is equal to the amplitude of the probe signal Vprobe, already an improved accuracy is obtained if the amplitude of the shield signal Vshield is, for example, in a range of 50% to 150% of the amplitude of the probe signal Vprobe. However, in practice the shield signal Vshield should have an amplitude close to that of the probe signal, e.g. within a range of 90 to 110%, in particular within a range of 95 to 105%. The sensor circuit 300 also has a detection module 330 for generating a touch signal Stch in response to an output signal Isense received from the common electrode layer.

In the embodiment shown the combination unit 400 comprises a first multiplexer 410 for providing a drive signal Scc to the common electrode layer derived from the common display signal Sc and the at least one probe signal Vprobe. The combination unit comprises a second multiplexer 420 for providing at least one output control signal Sstc for the active matrix layer from the at least one of the input control signals Sst and the shield signal Vshield. The multiplexers 410, 420 are controlled simultaneously by mode controller 430 in response to a mode control signal Dm. The mode control signal Dm may be provided by the application and/or the user interface. During an operating mode, controller 430 causes first multiplexer 410 to alternately select the common display signal Sc and the at least one probe signal Vprobe as the drive signal Scc to the common electrode layer. Mode controller 430 causes second multiplexer 420 to alternately select the at least one of the input control signals Sst and the shield signal Vshield as the at least one output control signal Sstc.

Figure 2:
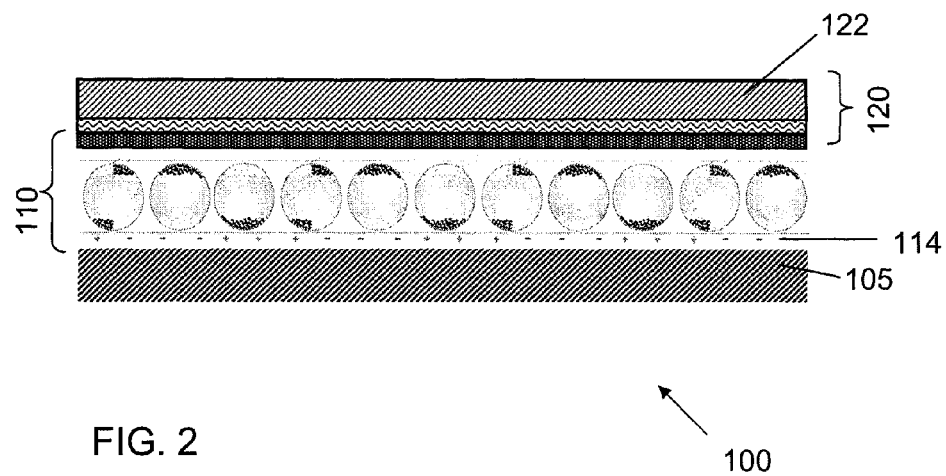
FIG. 2 shows a cross-section of a display panel for use in the touch screen display of FIG. 1.
Figure 2A:
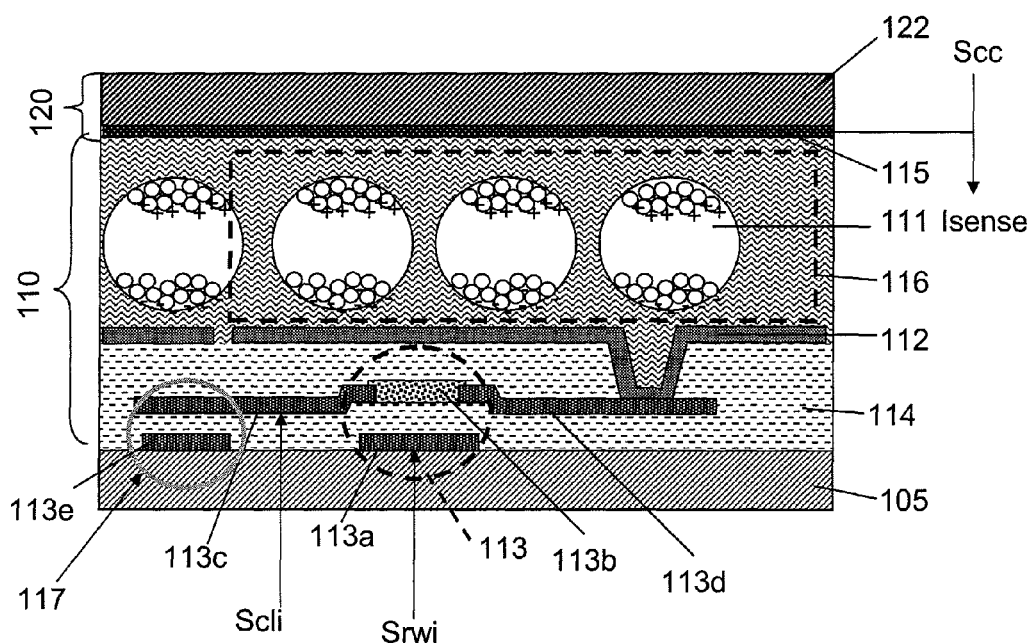
FIG. 2A shows a detail of the display panel of FIG. 2.

FIG. 2 schematically shows a cross-section of the display panel 100 in the embodiment of the display device of FIG. 1. FIG. 2A shows a detail of this embodiment of the display panel. In the embodiment shown the display panel includes a first structure 110 and a second structure 120 that are arranged upon a flexible substrate 105, e.g. a PET (Poly Ethylene Terephthalate) or PEN (Poly Ethylene Naphthalate) layer, having a thickness of less than 50 μm, preferably less than 25 μm, and more preferably less than 15 μm (e.g., 12.5 μm). The first and second structures 110, 120 cooperate to provide for a display function and a touch sensitive function. The structures 110, 120 share the common electrode layer 115. The second structure 120 serves to cap the underlying layers. The underlying layers in the first structure 110 provide mechanical support to the second structure 120, therewith making it suitable for touch events.

Figure 3:
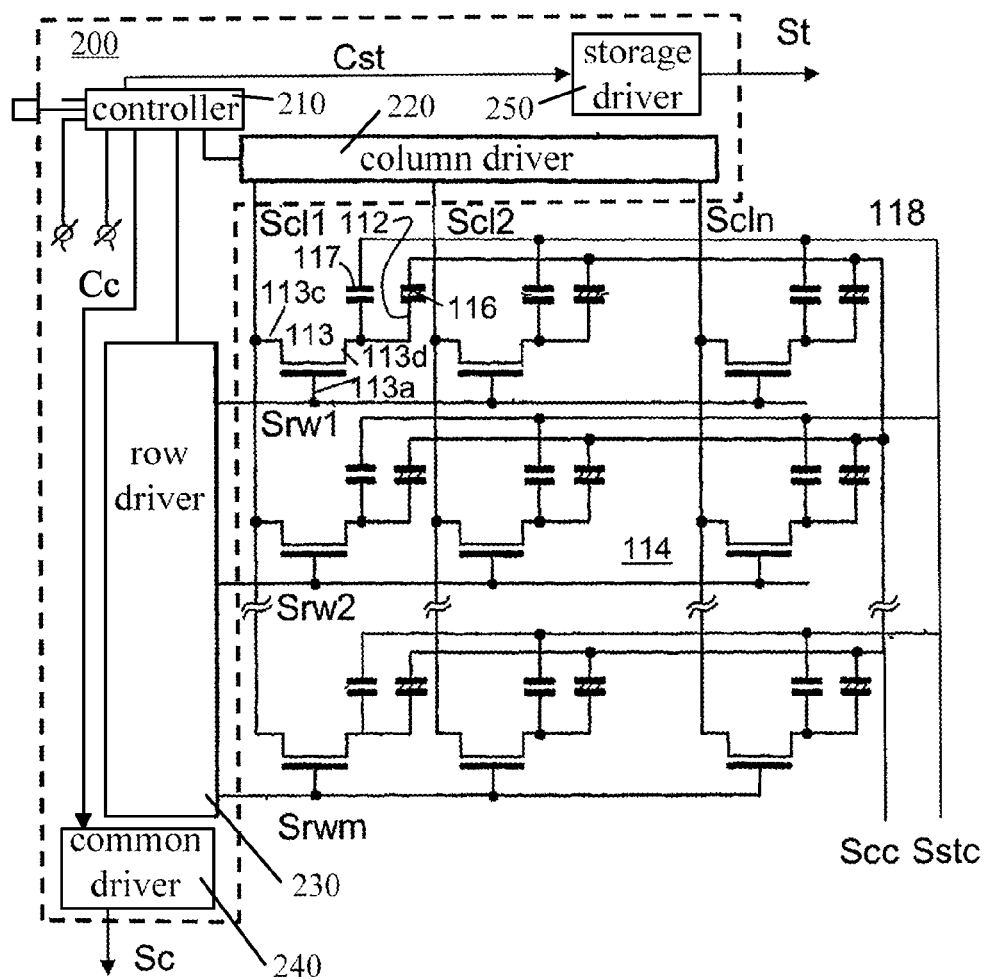
FIG. 3 shows an example of an active matrix circuit.

The first structure 110 is responsive to the output signals Scl1, ..., n, Srw1, ..., m, Scc, and Sstc obtained directly or indirectly from the display driver 200 (see, e.g., FIG. 3). In the embodiment shown, the first structure 110 is reflection based. This is advantageous in that the display is well visible in sunlight. In particular the first structure 110 comprises a layer of multi-stable elements, here electrophoretic elements 111. The electrophoretic elements 111 are controlled by individual electrodes 112 and a fixed electrode formed by the common electrode layer 115 that is deposited onto substrate 122, which also seals the display at the top side. The individual electrodes 112 are driven by active switching elements, here thin film transistors 113 in active matrix layer 114. The thin film transistor has a gate electrode 113a, semiconducting channel 113b, source electrode 113c and drain electrode 113d that is electrically coupled to the individual electrode 112 of a display element 116. A storage capacitor 117 is formed by a conducting element 113e at flexible substrate 105 and a portion of the source electrode 113c opposite conducting element 113e. The display element 116 controlled by the active switching element 113 comprises a set of one or more electrophoretic elements 111 in the form of microcapsules embedded in a medium. An electrophoretic display has the advantage that power is only required to change the image content, and not to maintain the image. Electrophoretic materials are for example provided by E Ink Corporation or SiPix Imaging, Inc.

Another technology using bistable elements is based on liquid-behavior-powder as provided by Bridgestone Corporation, as described in a "Development of Novel Bistable Display using Titania Composite" by Hiroaki Wada et al downloaded from http://www.scientific.net.

Nevertheless, the first structure 110 may be based on another display technology, e.g. CTLC (Cholesteric Texture Liquid Crystal), BiNem™ (Bistable Nematic), an electrofluidic technology or an emissive technology. For example the display layer may comprise other active display elements like OLEDs. This has the advantage that the display is also visible in dark environments. A disadvantage might be the lack of bistability or multistability for such display media.

The display panel 100 further comprises a second structure 120, comprising the transparent electrically conductive layer 115 and a dielectric layer 122, carried by the layers of the display underneath. The transparent electrically conductive layer 115 is shared by the first structure 110 and the second structure 120. FIG. 3 schematically shows how the output signals Scl1, . . . , n, Srw1, . . . , m, Scc, Sstc are obtained from the display driver 200.

FIG. 3 shows the display device of FIG. 1 now, with the circuitry of the active matrix layer 114 in more detail. In FIG. 3 it can be seen that the pixel electrodes 112 are coupled to a first side of a respective storage capacitor 117, and that a second side of said storage capacitor is coupled to the storage line 118. At least one of the control signals Sstc is a signal for driving the storage line 118.

In the embodiment of the display device described with reference to FIGS. 1, 2, 2A and 3, the sensor circuit 300 generates a single probe signal Vprobe and generates the touch signal Stch in response to a single output signal Isense received from the common electrode layer 115. This embodiment has the advantage that a relatively small amount of hardware is sufficient. The sensor circuit only needs a single driver 310 for driving the common electrode. This embodiment makes it possible to detect whether the display is touched or not. To that end the detection module 330 of the sensor circuit 300 may be provided with a threshold detector that detects whether the sensed current Isense has an amplitude that deviates more than a threshold value from a nominal value. In this way a binary touch signal Vtch is generated. This binary touch signal Vtch can be used to make more complex choices between various options by presenting these options on the display panel 100 sequentially and determining which option was presented at the moment when it is detected that the display panel 100 is touched (e.g., enabling navigation through a menu option tree).

Instead of controlling the storage capacitor by a single storage line 118, separate storage lines may be available for each line in the matrix of pixels. In that case the combination unit provides a combined control signal for each of those storage lines from a respective input control signal generated by the display driver and from the shield signal provided by the sensor circuit.

Figure 4:
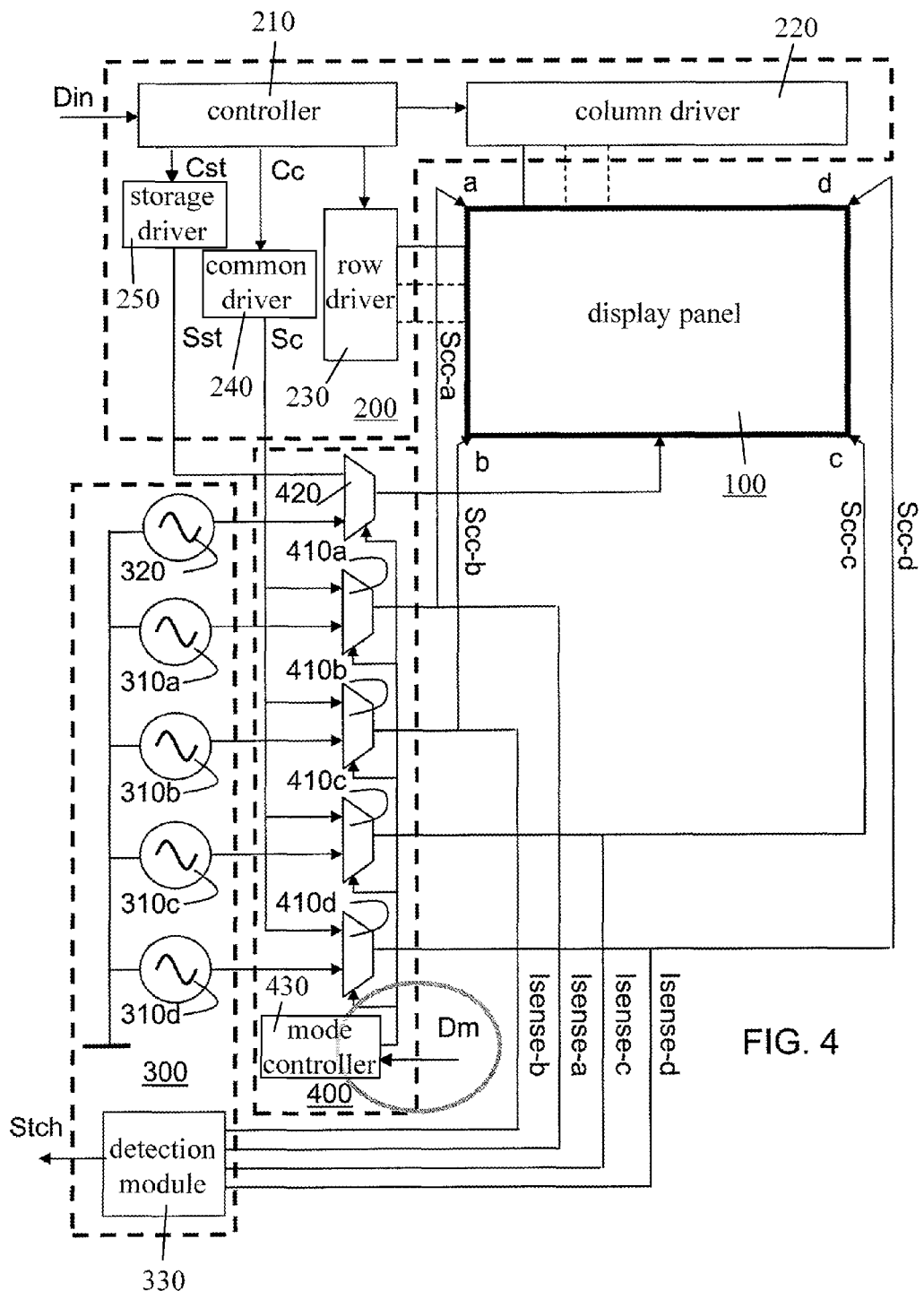
FIG. 4 schematically shows a second embodiment of a touch screen display according to the first aspect.

Another embodiment is schematically shown in FIG. 4. Parts therein corresponding to those in FIG. 1 have the same reference number. In the embodiment of FIG. 4 the combination unit 400 differs from the combination unit 400 of FIG. 1 in that it has respective combination elements coupled to respective corners a-d of the common electrode layer 115 of the display panel 100. Furthermore the sensor circuit 300 differs from the sensor circuit 300 of FIG. 1 in that it has respective first signal generators 310a, 310b, 310c, 310d for providing a respective probe signal to a first input of a respective combination element 410a, 410b, 410c, 410d. Each of the combination elements has a second input coupled to the common electrode driver 240 for providing the signal Sc. The detection module 330 generates the touch signal Stch in response to output signals Isense-a, Isense-b, Isense-c, Isense-d received from respective corners a-d of the common electrode layer 115.

Figure 5:
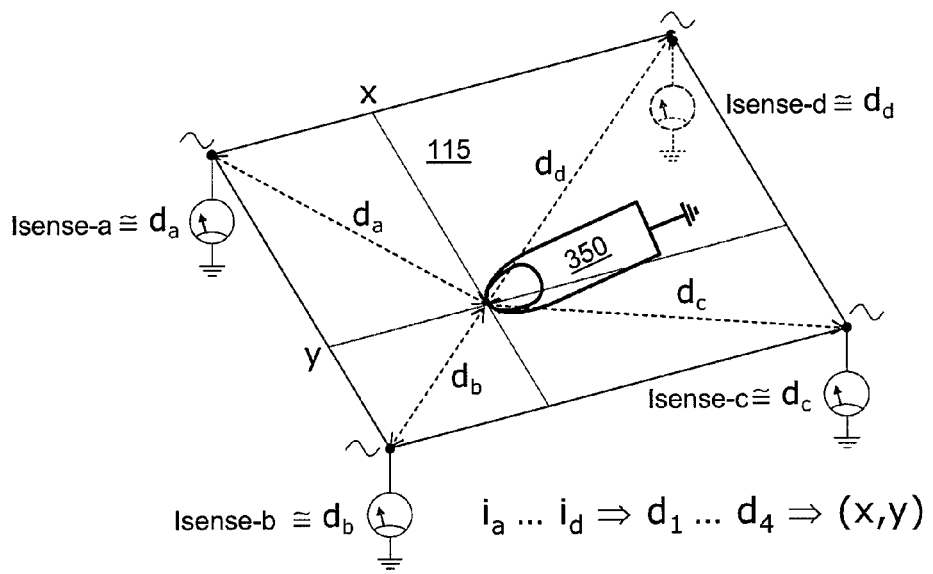
FIG. 5 illustrates operation of said second embodiment.

This arrangement renders it possible to not only determine whether the display panel is touched, but also to determine the location where the display panel is touched. The principle thereof is illustrated in FIG. 5. When an alternating voltage Vprobe-a, . . . Vprobe-d is applied at the respective corners of the common electrode layer 115, and a finger 350 or other pointing device touches the display panel, different currents Isense-a, Isense-b, Isense-c, Isense-d will capacitively leak away from said corners a-d depending on the distance from the point (x,y) where the panel is touched to said corners. Accordingly the position (x,y) can be estimated from the measured currents by the following relationships:

$x = f(\text{Isense\_}a, \text{Isense\_}b, \text{Isense\_}c, \text{Isense\_}d)$ and $y = g(\text{Isense\_}a, \text{Isense\_}b, \text{Isense\_}c, \text{Isense\_}d)$ As the shield signal Vshield, which has the same amplitude, frequency and phase as the probe voltages Vprobe, is applied to another conductive structure of the display panel 100, the parasitic currents from the common electrode layer 115 to said other conductive structure are mitigated. In this case the conductive structure that is provided with the shield signal Vshield is the storage capacitor line. Alternatively or additionally other conductive structures, such as, for example, a ground network, or a conducting boundary at the circumference of the display panel, may be provided with the shield signal Vshield. In general, it is beneficial to mitigate parasitic currents for all structures in the display that have a large overlap area with the common electrode layer 115 by providing them with the shield signal Vshield.

In the embodiment shown, the position of the pointing device is estimated on the basis of four sense signals. It may be possible to obtain a more accurate estimation by calculating the position from a larger plurality of sense signals. Alternatively the position (x,y) could be sensed using only three sense signals obtained, for example, from three corners of an imaginary triangle in the plane of the common electrode layer 115. In yet another embodiment the sensor circuit merely measures a position in one direction, using two sense signals obtained from respective points at mutually remote ends of the common electrode layer 115, that are provided with a probe signal Vprobe-a, Vprobe-b. Examples are shown in WO2009/075577, e.g. a meander-shaped patterned common electrode layer.

Figure 5A:
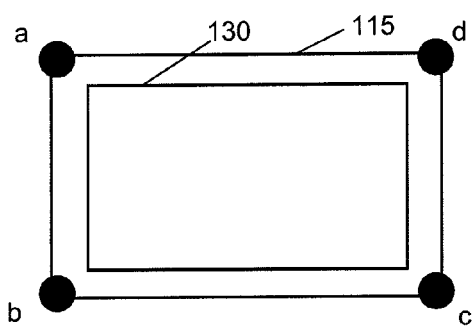
FIGS. 5A and 5B illustrate a non-linear relation between the indicated position and the sensed position.
Figure 5B:
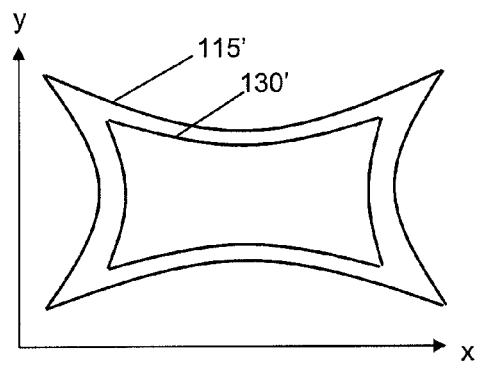

As illustrated in FIGS. 5A, 5B, in practice the relation between the sensed currents Isense-a, . . . Isense-d is not exactly linear in relation to the distances of the touched position of the display to the corners a, b, c, and d thereof. FIG. 5B schematically shows the coordinates 115' that would be calculated for the edge of the common electrode layer 115, if this non-linearity would not be taken into account. In an embodiment the common electrode layer 115 extends beyond the display area 130.

Figure 5C:
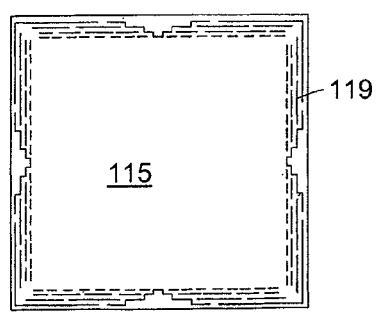
FIG. 5C illustrates a part of a third embodiment of a touch screen display according to the first aspect.

The extension distance is preferably in a range between 10 to 20% of the size of the display area in the direction of extension. A substantially smaller extension distance, such as, for example, a distance less than 5% of the relevant display size, would not result in a significant improvement of linearity, whereas a substantially larger extension distance, such as, for example, a distance more than 30% of the relevant display size would result in a relatively bulky product. It can be seen that the observed distortion 130' for the edge of the display area 130 within the common electrode layer 115 is substantially less than those for the edge of the common electrode layer itself. Alternatively, or in addition, the calculated coordinates may be corrected for the non-linearities by use of a compensation module provided, for example, in the form of a dedicated processor or suitably programmed general purpose processor. In yet another embodiment, an electrically conductive segment pattern 119 is applied around the border of the common electrode layer 115 as shown in FIG. 5C.

Figure 6:
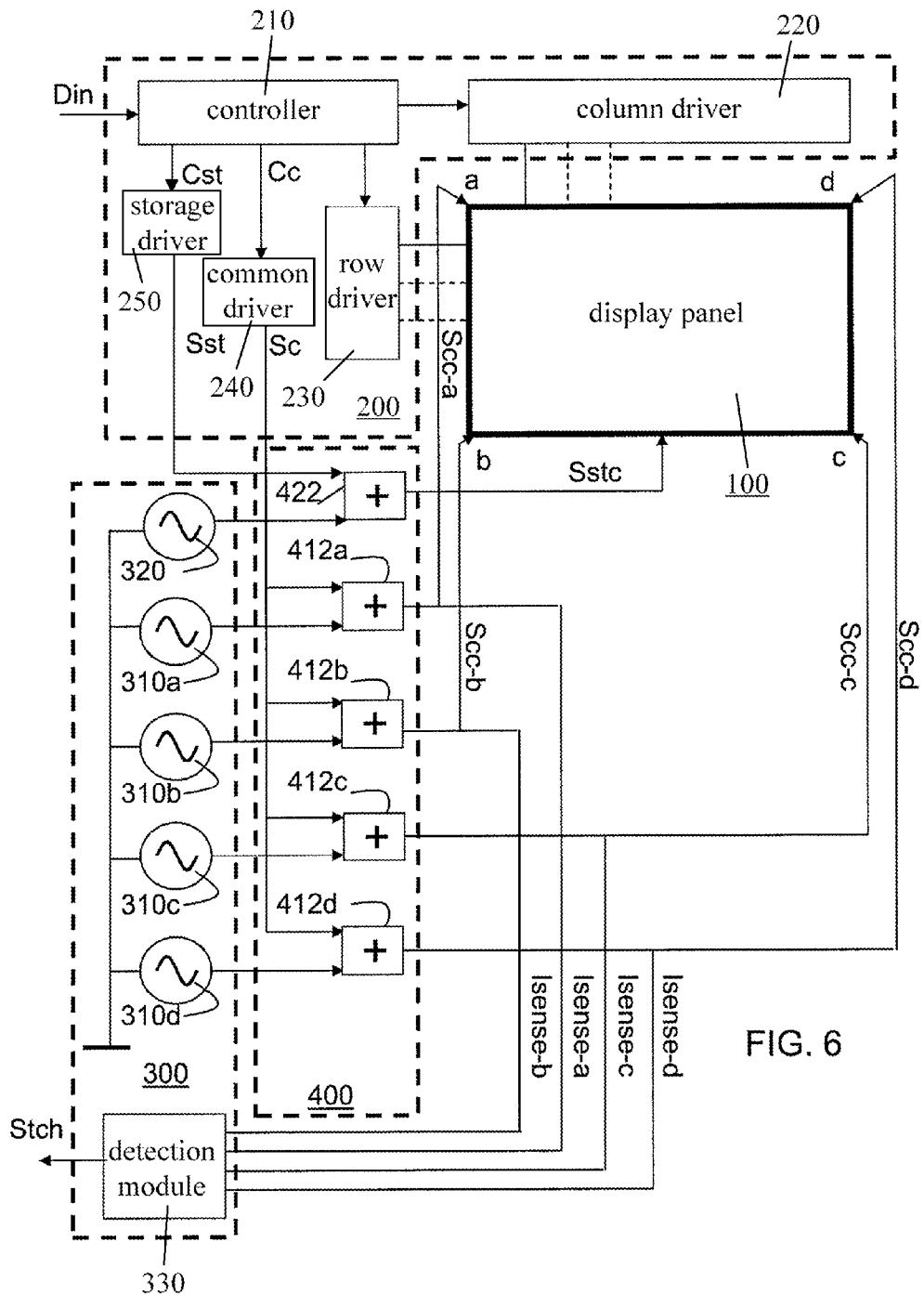
FIG. 6 schematically shows a fourth embodiment of a touch screen display according to the first aspect.

FIG. 6 shows an alternative embodiment wherein the combination unit 400 comprises combination elements formed by superposition elements. The combination unit 400 has first superposition elements 412a, 412b, 412c, 412d that each derive a respective drive signal Scc-a, Scc-b, Scc-c, Scc-d for the common electrode layer 115 by summation of the common display signal Sc and a respective probe signal Vprobe. The combination unit 400 further has a second combination element in the form of a superposition element 422 for providing an output control signal, here a storage line signal Sstc for the active matrix layer, by summation of the shield signal Vshield and at least one of the input control signals, here the storage line signal Sst generated by the display driver 200. Alternatively, it is possible that the combination elements subtract the input signals from each other to obtain the combined signal. In yet other embodiments it is possible to combine the input signals by a multiplication, a division, or a convolution of waveforms, but this would generally require more complicated hardware and would cause non-linearities in the combined signal.

In the embodiments shown, the display driver 200 and the sensor circuit 300 have separate large signal drivers. For example the display driver 200 has a large signal driver for generating the common signal Sc and the sensor circuit 300 has a large signal driver for the probe signal Vprobe.

In this embodiment the sensor circuit 300 may have a high-pass filter for preprocessing the sense signals Isense-a, . . . , Isense-d. The high-pass filter blocks the relatively low-frequency signals introduced by the display driver in the sense signals.

Figure 7:
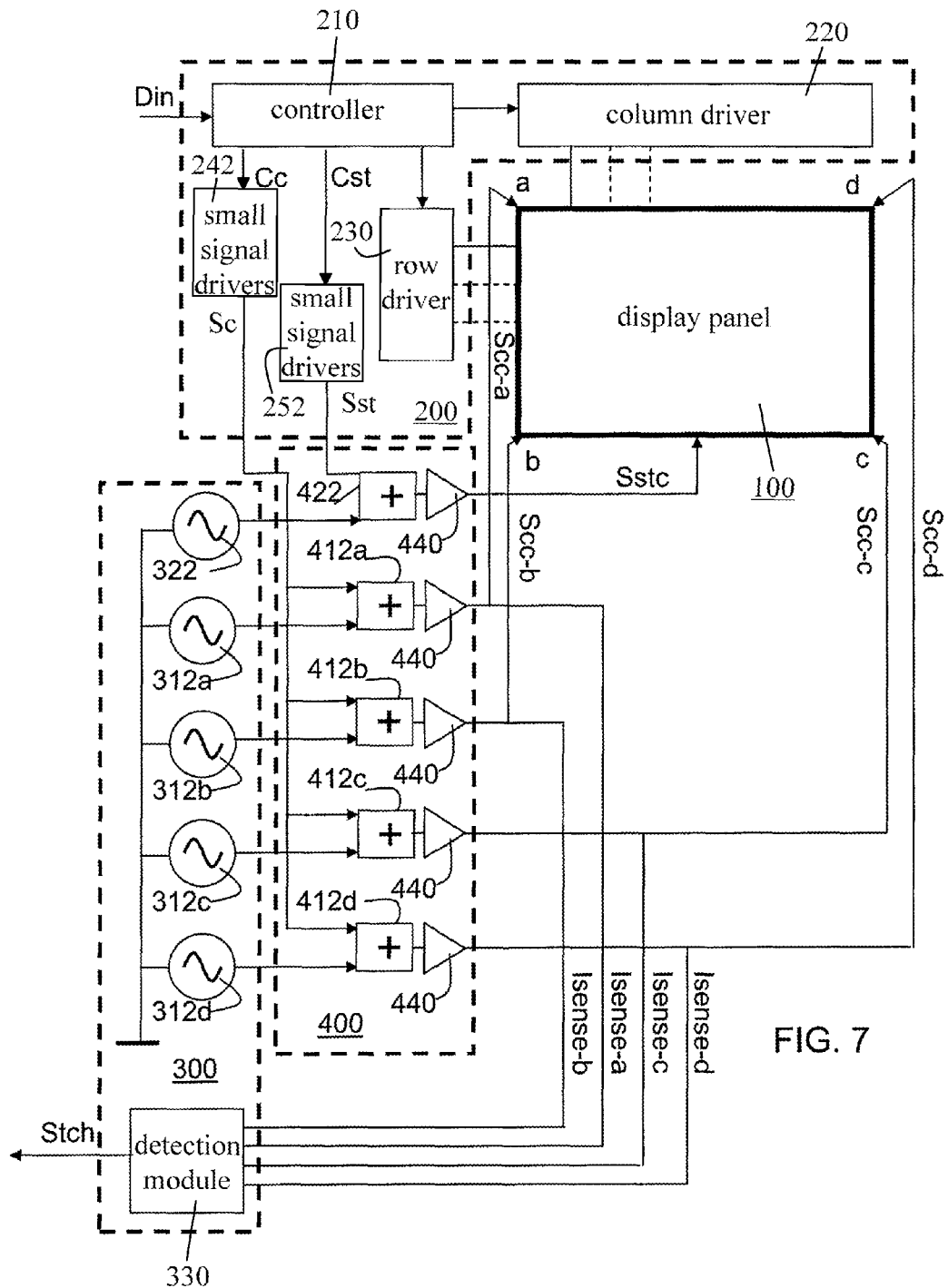
FIG. 7 schematically shows a fifth embodiment of a touch screen display according to the first aspect.

FIG. 7 shows an alternative embodiment of the display device according to the first aspect of the invention wherein the display driver 200 and the sensor circuit 300 use small signal drivers for the signals that are combined by the combination unit 400, and wherein the combination unit 400 provides for amplification of the combined signals. More particularly, in the embodiment shown in FIG. 7, the display driver 200 has small signal drivers 242, 252 for providing the common electrode layer drive signal Sc and the storage line signal Sc. The sensor circuit 300 has first small signal drivers 312a, 312b, 312c, 312d for providing the probe signals to the respective combination elements 412a, 412b, 412c, 412d and a second small signal driver 322 for providing a shield signal to the combination element 422. The combination unit has amplifiers 440 for amplifying the output signals of the combination elements 412a, 412b, 412c, 412d and 422. In this embodiment small signal circuitry can be used to provide the probe signals and the shield signal, as well as provide the signals Sc and Sst. In addition the combination elements 412a, 412b, 412c, 412d and 422 can be provided by small signal circuitry. Small signal circuitry is advantageous in that it requires less area and has lower power consumption. In the embodiment of FIG. 7 the combination elements 412a, 412b, 412c, 412d, 422 formed by superposition elements, may be replaced by multiplexers.

Figure 8:
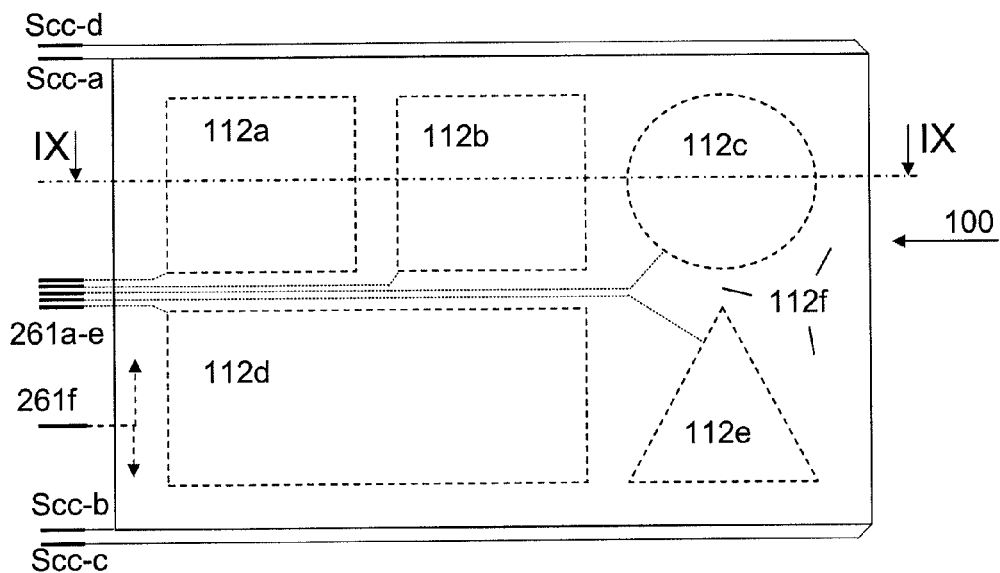
FIG. 8 schematically shows a sixth embodiment of a touch screen display according to the first aspect.
Figure 9:
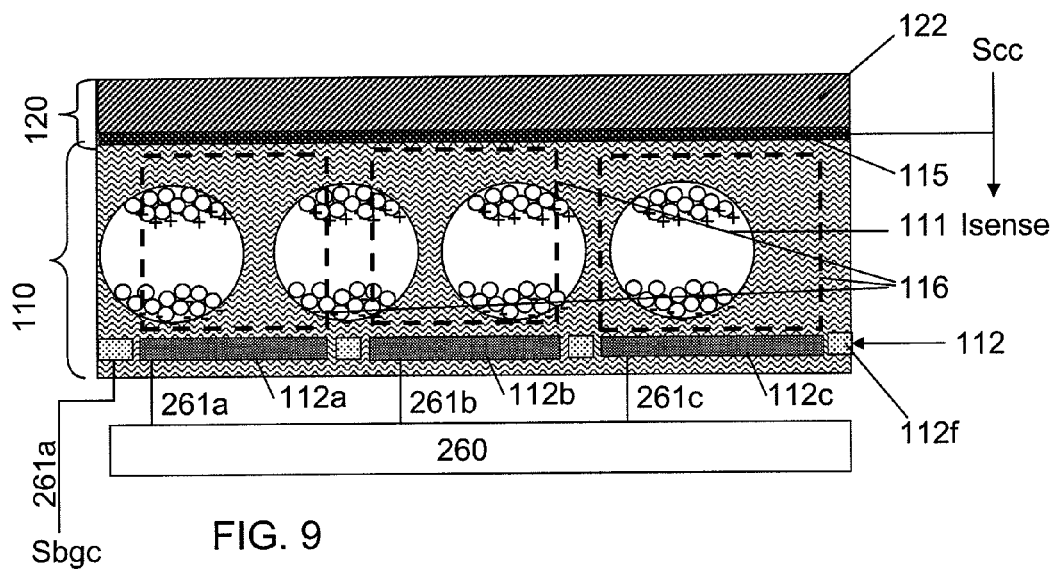
FIG. 9 shows a cross-section through the display according to IX-IX in FIG. 8.

FIG. 8 schematically shows a sixth embodiment of a touch screen display according to the first aspect. FIG. 9 shows a cross-section through the display according to line IX-IX in FIG. 8. In the sixth embodiment the touch screen is a direct drive/segmented display. The display of FIG. 8 differs from the examples described above, in that it has segments that are driven directly by external signal lines instead of by circuitry as shown, for example, in FIG. 3. In the embodiment shown in FIG. 8, the layer of multistable elements 111 is arranged between a common electrode 115 and a segmented electrode 112 having segments 112a, 112b, 112c, 112d, 112e. Furthermore, the segmented electrode 112 has a background segment 112f that extends in the remaining area between the segments 112a-e. The segments 112a-f are electrically insulated from each other. The boundaries between segments 112a-f are shown by dashed lines in FIG. 8.

FIG. 9 shows three segments 112a, 112b, 112c and their connection to segment driver 260 via respective segment drive lines 261a, . . . , 261c. Also segment 112f and its connection to signal line 261f that carries signal Sbgc are shown. Although all segments form part of the same electrode layer 112, for clarity, segment 112f on the one hand and segments 112a-e are shown by a different hatching in FIG. 9. Segments 112d, 112e are not visible in this cross-section, and for clarity segment drive lines 261d and 261e are not shown.

Figure 10:
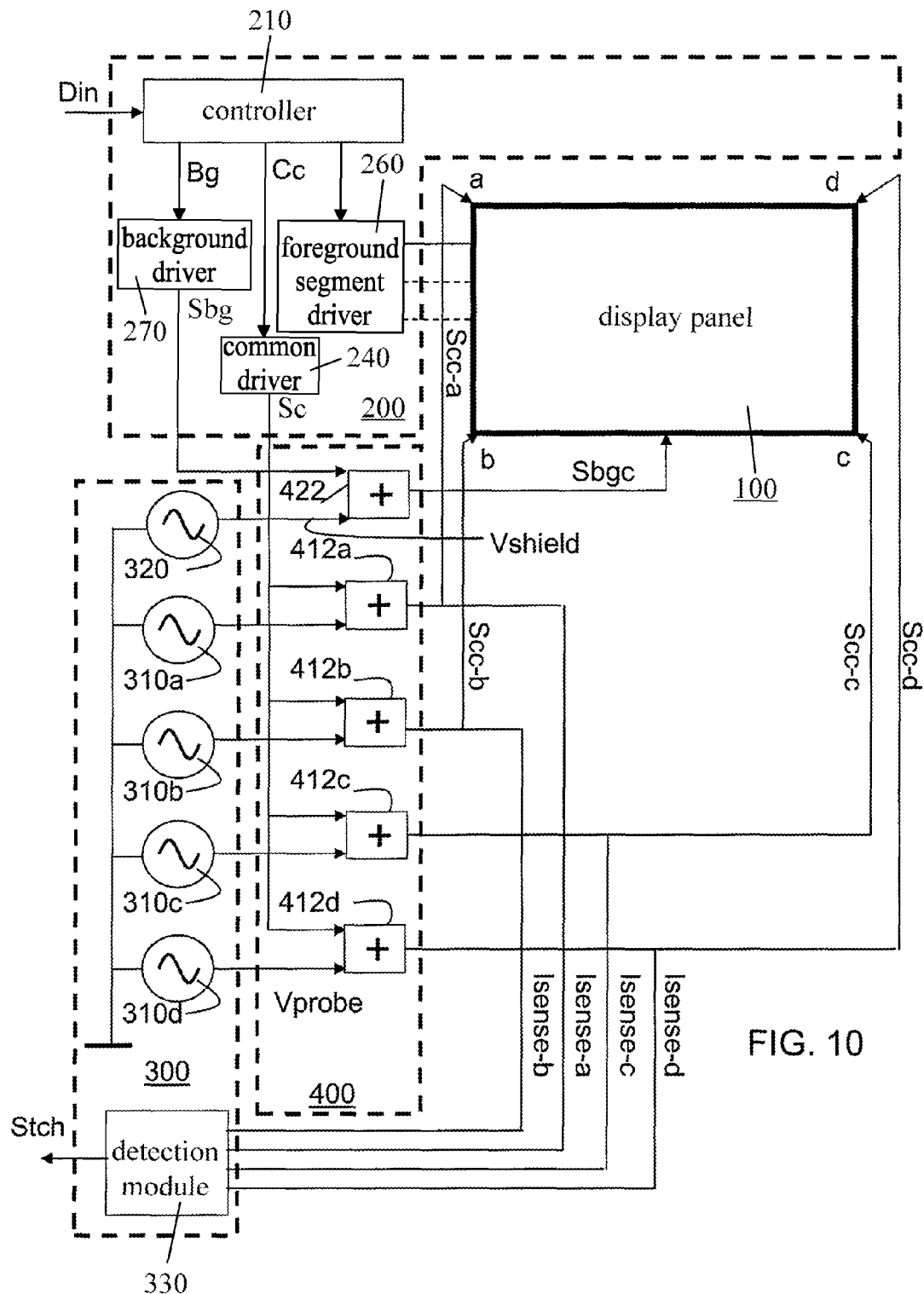
FIG. 10 schematically shows an embodiment of a touch screen display device including the display shown in FIGS. 9 and 10 and a driver therefore.

FIG. 10 shows the display system including the display 100 and the driver hardware for providing the display driving and touch screen functionality. In the embodiment shown the display system has a foreground segment driver 260 for providing the control signals for the segments 112a-e. The display system also has a background driver 270 for providing an input control signal Sbg for the segment 112f. The display system further comprises a combination unit 400 for providing drive signals signal Scc-a, . . . Scc-d to the common electrode layer 115 derived from the common display signal Sc and the at least one probe signal Vprobe, and for providing at least one output control signal Sbgc for the electrode 112f for the background segment from the at least one input control signal Sbg and the shield signal Vshield.

In this embodiment the combination unit 400 comprises superposition units 412a, . . . 412d, 422 for deriving the drive signal Scc-a, . . . , Scc-d and for deriving the output control signal Sbgc for the segment 112f. In another embodiment the superposition units may be replaced by other combination elements, for example by multiplexers analogous to the embodiment shown in FIG. 4 for the active matrix display.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. A touch screen display device comprising:
a display panel comprising a plurality of display elements arranged between a first electrode layer and a second electrode layer having respective pixel electrodes for the display elements;
a display driver for providing display signals to the display panel, said display signals comprising:
a common display signal, and
an input control signal for controlling the display panel;
a sensor circuit for providing a probe signal and a shield signal, and for generating a touch signal in response to an output signal received from the first electrode layer, wherein the phase and frequency of the probe signal are identical to the phase and frequency of the shield signal; and
a combination unit for providing a drive signal to the first electrode layer derived from the common display signal and the probe signal, and for providing the output control signal for controlling the display panel, wherein the output control signal is derived from the input control signal and the shield signal.

2. The touch screen display device according to claim 1, wherein the display panel includes an active matrix layer for driving the pixel electrodes, wherein the input control signal is an input control signal for the active matrix layer, and wherein the output control signal is for the active matrix layer.

3. The touch screen display device according to claim 2, wherein the pixel electrodes are coupled to a first side of a respective storage capacitor, a second side of said storage capacitor being coupled to a storage line and wherein the output control signal is a signal for driving the storage line.

4. The touch screen display device according to claim 1, wherein the combination unit comprises a first multiplexer for deriving the drive signal by multiplexing the common display signal and the probe signal and a second multiplexer for deriving the output control signal by multiplexing the input control signal and the shield signal.

5. The touch screen display device according to claim 1, wherein the combination unit comprises a first superposition unit for deriving the drive signal by superposing the common display signal and the probe signal and a second superposition unit for deriving the output control signal by superposing the input control signal and the shield signal.

6. The touch screen display device according to claim 1, wherein the display driver and the sensor circuit have small signal drivers for those signals that are combined by the combination unit and wherein the combination unit has a respective amplifier for amplification of the combined signals.

7. The touch screen display device according to claim 1, wherein the first electrode layer extends beyond the display area.

8. The touch screen display device according to claim 7, wherein the first electrode layer extends beyond the display area over an extension distance that is in a range between 5 to 30% of the size of the display area in the direction of the extension.

9. The touch screen display device according to claim 1, wherein the shield signal is applied to another conductive structure of the display panel.

10. The touch screen display device according to claim 1, wherein the shield signal is applied to all conductive structures of the display panel having a large overlap with the first electrode layer.

11. A method of driving a touch screen display device, the display device comprising a display panel comprising a plurality of display elements arranged between a first electrode layer and a second electrode layer having respective pixel electrodes for the display elements, the method comprising the steps of:
providing display signals for the display panel, comprising a common display signal and an input control signal for the display panel;
providing a probe signal and a shield signal, wherein the phase and frequency of the probe signal are identical to the phase and frequency of the shield signal;
generating a touch signal in response to an output signal received from the first electrode layer;
providing a drive signal to the first electrode layer derived from the common display signal and the probe signal, and
providing the output control signal for the display panel, wherein the output control signal is derived from the input control signal and the shield signal.

12. The method of claim 11 wherein the display panel includes an active matrix layer for driving the pixel electrodes, wherein the input control signal is an input control signal for the active matrix layer, and wherein the output control signal is for the active matrix layer.

13. The method claim 12, wherein the pixel electrodes are coupled to a first side of a respective storage capacitor, a second side of said storage capacitor being coupled to the storage line and wherein the output control signal is a signal for driving the storage line.

14. The method of claim 11 wherein a first multiplexer, during the providing a drive signal step, derives the drive signal by multiplexing the common display signal and the probe signal, and wherein a second multiplexer, during the providing an output control signal step, derives the output control signal by multiplexing the input control signal and the shield signal.

15. The method of claim 11 wherein a first superposition unit, during the providing a drive signal step, derives the drive signal by superposing the common display signal and the probe signal, and wherein a second superposition unit, during the providing an output control signal step, derives the output control signal by superposing the input control signal and the shield signal.

16. The method of claim 11, wherein both a display driver that provides the display signals to the display panel, and a sensor circuit that provides the probe signal and shield signal, have small signal drivers for those signals that are combined, and
wherein a respective amplifier is provided for amplification of the combined signals.

17. The method of claim 11, wherein the first electrode layer extends beyond the display area.

18. The method of claim 15, wherein the first electrode layer extends beyond the display area over an extension distance that is in a range between 5 to 30% of the size of the display area in the direction of the extension.

19. The method of claim 11, further comprising a step of providing the shield signal to another conductive structure of the display panel.

20. The method of claim 11, further comprising a step of providing the shield signal to all conductive structures of the display panel having a large overlap with the first electrode layer.

* * * * *